Jan. 6, 1931.  J. KARCEVSK  1,788,240
WORK RECEIVER FOR AUTOMATIC SCREW MACHINES
Filed Feb. 24, 1930
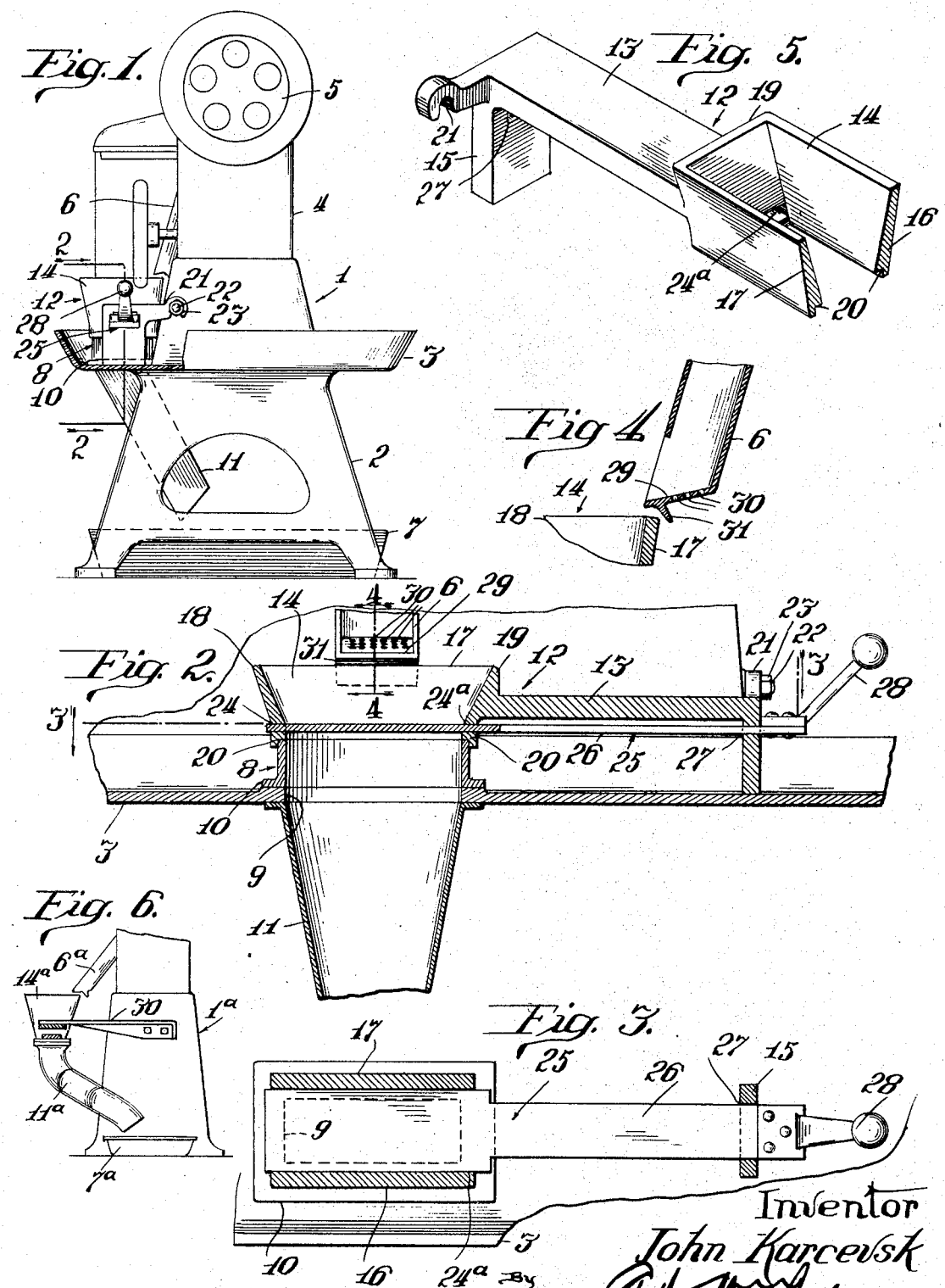

Patented Jan. 6, 1931

1,788,240

UNITED STATES PATENT OFFICE

JOHN KARCEVSK, OF CHICAGO, ILLINOIS

WORK RECEIVER FOR AUTOMATIC SCREW MACHINES

Application filed February 24, 1930. Serial No. 430,473.

This invention relates to work receivers for automatic screw machines and it consists of the matters hereinafter described and more particularly pointed out in the appended claims.

In establishments running many automatic screw machines, each operator has several machines under his supervision. The duties imposed upon each operator are many. He must gage or micrometer the finished pieces at certain intervals, make adjustments here and there, stock up, oil, repair, resharpen machine tools, inspect and dispose of finished pieces of work and keep the machines free from chips as practical. The most irksome duty is the disposing of the finished pieces of work. In some screw machines the finished pieces as they come from the cut-off tool, are delivered along with the resulting chips to the receiving pan on the floor below the machines. In some machines the finished pieces are separated from the chips and these pieces are discharged into a smaller container placed on the bed of the machine.

Where the pieces are dumped with the chips to the floor pan, the operator is supposed to inspect them at certain intervals to see that they are of a uniform good quality. Because of the large number of pieces in the pan, the inspection is indeed lax and haphazard, with the result that pieces of poor quality are passed and when they reach the consumer they are not fit for use. Such pieces are returned to the manufacturer, who scraps them with resulting loss in time, labor and material, all of which reduces production.

Where the receiving pan is placed upon the machine frame for future dumping into the floor pan, inspection conditions are somewhat improved, but such pans being small in capacity, require frequent dumping. Should the operator be busy at one machine this dumping is slighted and especially so because it requires the removal of certain other parts of the machine and becomes full to overflowing, with the result that poor quality of work passes out with the good quality. Eventually some of the work is turned back to the producer with the usual loss.

With the demand for greater production from the screw machines, which represents quite a capital investment, it is apparent that poor quality work cuts down the production with resulting loss.

The primary object of the present invention is to provide a work receiver for machines of this kind, wherein the finished work pieces may be temporarily collected in smaller amounts for easier inspection, which amounts may be dumped into a receiving pan on the floor, with but a small effort on the part of the operator and without requiring the removal of any part of the machine to carry out such dumping.

Another object of the invention is to provide a work receiver of this kind which insures easier inspection of the pieces delivered thereto whereby the necessity for adjustment may be more easily detected to prevent the further production of defective pieces.

Still another object of the invention is to provide a work receiver of this kind which increases the rate and quality of production by eliminating several of the steps or operations heretofore necessary and left undone because of the effort and time required to accomplish the same.

A further object of the invention is to provide a work receiver of the kind which may be readily applied to old machines now in use, with a view toward increasing their production, as well as to new machines during their course of manufacture.

These objects of the invention, as well as others, together with the many advantages thereof, will more fully appear as I proceed with my specification.

In the drawing:

Fig. 1 is a view in end elevation of an automatic screw machine of a well-known type embodying my improved work receiver.

Fig. 2 is a longitudinal vertical detail sectional view through the same on an enlarged scale as taken on the line 2—2 of Fig. 1.

Fig. 3 is a longitudinal horizontal sectional view through my improved work receiver, as taken on the line 3—3 of Fig. 2.

Fig. 4 is a detail vertical sectional view through a part of the same as taken on the line 4—4 of Fig. 2.

Fig. 5 is a perspective view of the main member of my improved work receiver, with a part broken away to better show the interior construction thereof.

Fig. 6 is a detailed view in end elevation of a modified form of the invention, embodying my invention.

My improved work receiver may be readily applied to machines now in use by the addition of an adapter which in new machines will be made as an integral part of the bed of the same. In general, the receiver includes an open top hopper positioned beneath the chute which delivers the finished pieces of work thereinto. This hopper includes a laterally extending portion forming a table-like support for such tools as are employed in adjusting the various mechanisms of the machine and it includes an end supporting leg and a means by which the hopper is removably secured in position to the machine frame. In the bottom of this hopper is a slide which normally closes off the same and this slide has a handle at one end whereby it may be moved to open the hopper to discharge the collection of work pieces therein, through the adapter and into the floor pan.

Referring now in detail to that embodiment of the invention illustrated in the accompanying drawing, 1 indicates as a whole an automatic screw machine which includes the usual supporting legs 2, table 3, operating head standards 4 and tool spindle heads 5. At about the middle of the machine is a chute 6 that receives the finished work pieces after operation thereon by the cut-off tool, in the manner well known. 7 indicates the receiving pan usually positioned on the floor between the legs 2—2. All of the construction above described, which is well-known, may be found upon substantially any of the conventional automatic screw machines at present in use.

Upon automatic screw machines now in use I provide an adapter 8 and secure the same to the floor of the table 3, after cutting a suitable opening 9 therein. Such an adapter comprises an upright, rectangular tubular member having a flange 10 at its bottom end which is secured to the floor of the table in any suitable manner, about the opening 9 therein. This adapter, of course, will be positioned at the front of the machine in substantially the transverse plane of the work chute 6. To the floor of the table below the adapter, I provide a downwardly and rearwardly extending chute 11 adapted to discharge into the work pan 7 on the floor between the legs 2—2.

12 indicates as a whole (see Fig. 5), the main member of my improved work receiver which includes a horizontally disposed table 13 with an open top and bottom hopper 14 at one end and a depending leg 15 at the other end. The table 13 provides a convenient support for such hand tools and like parts as is required in adjusting the various mechanisms of the machine. The hopper includes front and rear walls 16 and 17 respectively and end walls 18 and 19 respectively, the latter wall being integral with the tool rest 13. The bottom ends of all of said walls are rabbeted as at 20 for a snug seating engagement upon the top of the adapter member 8. When said hopper is engaged upon the adapter, the leg 15 rests upon the floor of the table 3 as best shown in Fig. 2. To removably secure said main member in this position against displacement, due to vibration when the machine is in operation, I provide a rearwardly extending hook 21 on the leg end of said member which is adapted to engage upon a threaded stud 22 provided therefor on the associated standard 4, a nut 23 being associated with said stud to clamp the hook to said standard.

In the end walls 18 and 19, in a plane below that of the tool rest table, are formed openings 24 and 24ª respectively. A plate 25 is slidably engaged in supporting relation in said openings to normally close and provide the bottom for said hopper. Said plate is reduced in width at one end to form a narrower part 26 that extends through and beyond an opening 27 in the leg 15. To the free end of said narrower part, beyond said leg, is secured a handle 28 by means of which the plate may be moved into position for either opening or closing the bottom end of said hopper. In this respect it is stated that that part of the handle secured to the plate part 26, limits the movement of the plate in one direction and the shoulders at the junction of said plate parts 25—26 limit the movement of the plate in the other direction, upon engagement with the leg 15.

The chute 6 extends downwardly and forwardly from the cut-off tool and its free end is so positioned as to overhang and discharge into said hopper. Preferably, I provide a bottom 29 for said chute, of shallow inclination and in the rear end part thereof I provide openings 30 and on said wall I provide a guard 31 which when the work receiving member is in position, extends downwardly and rearwardly over the rear wall of the hopper. Thus as the finished pieces of work come down the chute, they engage upon the bottom wall 29 thereof. Several of such pieces may collect on the wall and the oil with which they are usually covered will drain through said openings. When more pieces come down the chute, those on the bottom wall will be dislodged therefrom to fall into the hopper. Such oil as drains through the openings 30 will flow down the bottom surface of the wall 19 and will then follow down the guard 31 so that it cannot enter the hopper.

When a number of the finished work pieces have been fed to and retained in the hopper, they may be inspected to determine the general run of the work at that time. If defective pieces appear, the operator immediately knows that adjustment of some mechanism of the screw machine is necessary. The adjustments are made and thus the further producing of defective pieces is guarded against. Thus, the production of the machine is increased, both in quality and number, with a corresponding reduction of loss in time, labor and material costs.

After a convenient number of pieces have been delivered into the hopper and inspection determines their fitness for use for their intended purpose, the plate 25 is moved endwise by means of the handle 28 and the pieces in the hopper fall through the adapter into the chute 11 to be discharged into the floor pan 7. The plate 25 is then actuated to again close the hopper bottom for another collection of a convenient number of pieces in the hopper for inspection as before.

It is the custom to clean the screw machine at regular periods for the removal of chips and excess oil gathered thereon. My improved work receiver, in no manner, interferes with this operation because all that is necessary is to remove the nut 23 and this releases the hook 21 so that the whole work receiver may be removed for better access to the machine parts. Thereafter, the work receiver is replaced in a manner which is apparent.

In some machines which do not include the table 3 I provide a construction shown more or less diagrammatically in Fig. 6. In said figure, 1ª indicates the machine as a whole which includes the chute 6ª as before. 7ª indicates the work receiving pan which is disposed at one end of the machine. 14ª indicates the hopper of the work receiver which is supported in a position forwardly of the machine and in operative relation with respect to the chute 6ª by means of brackets 30. In this case a chute 11ª is secured to the bottom end of the hopper and is curved or otherwise formed to convey the work piece from the hopper 14ª to the receiving pan 7ª. In this manner my improved construction may be advantageously employed where the frame of the machine is such as to make it necessary to place the pan 7ª at one end of said machine.

While in describing the invention I have referred in detail to the form, arrangement and construction of the various parts thereof, the same is to be considered merely as illustrative only so that I do not wish to be limited thereto except as may be specifically set forth in the appended claims.

I claim as my invention:

1. In combination with a work piece producing machine which includes a finished work piece chute and a receiver positioned below the same, an open top and bottom hopper supported upon said machine in a position below the chute and above the receiver, and a device normally closing the bottom of the hopper movable to open the same to dump the pieces therein into said receiver.

2. In combination with a work piece producing machine which includes a frame, a finished work piece chute and a receiver positioned below the same, means providing a hopper on the frame below said chute for collecting a quantity of pieces from said chute, a slide-like bottom for said hopper whereby said hopper may be opened and closed and means providing a conduit for directing the articles in said hopper into said receiver after said slide-like bottom has been moved to open the hopper.

3. In combination with a work piece producing machine which includes a frame, a finished work piece chute and a receiver positioned below the same, means providing an upright tubular member on the frame below said chute and arranged to discharge into the receiver, a hopper adapted to be removably engaged upon said tubular member, for collecting a quantity of pieces from said chute, a slidable bottom for said hopper whereby the same may be opened and closed and means for locking the hopper to said frame.

4. In combination with a work piece producing machine which includes a frame, a finished work piece chute and a receiver positioned below the same, means providing an upright tubular member on the frame below said chute and arranged to discharge into the receiver, a table-like member having a hopper at one end adapted to engage upon said upright tubular member and having a leg at the other end to engage upon said frame, means for locking said table-like member to the machine frame and means providing a sliding bottom for the hopper, disposed beneath said table-like member and operable from the leg end thereof.

5. A device of the kind described comprising a table-like member having an open top and bottom hopper at one end and a depending leg at the other end, a member disposed beneath and slidably mounted on said table-like member having one end formed to open and close the bottom of said hopper and having its other end extending through and beyond said leg and means providing an actuating handle on said last mentioned end of said member.

6. A device of the kind described comprising a table-like member having an open top and bottom hopper at one end and a leg at the other end that depends into a plane below that of the bottom of the hopper, a member positioned below said table-like member and having a part at one end to provide a slidable bottom for the hopper and having a part at the other end to extend through and beyond said leg and a member on said table-like member for engaging a part of a machine frame whereby the table-like member may be removably secured thereto.

In testimony whereof, I have hereunto set my hand, this 19th day of February, 1930.

JOHN KARCEVSK.